US006618124B2

(12) United States Patent
Paritsky et al.

(10) Patent No.: US 6,618,124 B2
(45) Date of Patent: Sep. 9, 2003

(54) OPTICAL MICROPHONE/SENSOR

(75) Inventors: Alexander Paritsky, Modi'in (IL); Alexander Kots, Ashdod (IL)

(73) Assignee: Phone-Or Ltd., Or Yehuda (IL)

( * ) Notice: Subject to any disclaimer, the term of this patent is extended or adjusted under 35 U.S.C. 154(b) by 0 days.

(21) Appl. No.: 10/049,811

(22) PCT Filed: Jun. 25, 2001

(86) PCT No.: PCT/IL01/00576

§ 371 (c)(1), (2), (4) Date: Feb. 19, 2002

(87) PCT Pub. No.: WO02/01912

PCT Pub. Date: Jan. 3, 2002

(65) Prior Publication Data

US 2003/0035343 A1 Feb. 20, 2003

(30) Foreign Application Priority Data

Jun. 28, 2000 (IL) ................................................ 137069

(51) Int. Cl.[7] ............................. G01C 3/08; G01J 1/04; G01J 1/42; G01B 9/10; G02B 6/00

(52) U.S. Cl. ................................ 356/4.07; 250/227.14; 250/227.28; 385/12

(58) Field of Search .............................. 356/4.01, 4.07; 250/227.14, 227.28; 385/12

(56) References Cited

U.S. PATENT DOCUMENTS 3,940,575 A * 2/1976 Bauer ......................... 381/177
4,777,650 A * 10/1988 Frederiksen ................ 381/174
5,189,777 A * 3/1993 Guckel et al. ................ 29/424
5,333,205 A * 7/1994 Bogut et al. ................ 381/172
5,771,091 A * 6/1998 Paritsky et al. ............ 356/4.01
6,091,497 A * 7/2000 Paritsky et al. ............. 356/623
6,239,865 B1 * 5/2001 Paritsky et al. ............ 356/4.07

* cited by examiner

*Primary Examiner*—Thomas H. Tarcza
*Assistant Examiner*—Brian K Andrea
(74) *Attorney, Agent, or Firm*—G.E. Ehrlich (1995) Ltd.

(57) ABSTRACT

The invention provides a microphone/sensor, including a housing defining a chamber and having an opening; at least one pair of optical waveguides, each having an input end portion and an output end portion, the input end portion of a first waveguide being optically coupled to a source of light and the output end portion of a second waveguide being optically coupled to a light intensity detector; a membrane having two opposite surfaces extending across the opening to form a sealed-off chamber inside the housing; a head, including the input end portion of the second optical waveguide and the output end portion of the first optical waveguide, affixedly located at least in proximity to each other, each of the output end portion of the first waveguide and input end portion of the second waveguide having an optical axis and an output face, the output face being cut at an angle $\theta$ with respect to the axis, the axes forming an angle $\alpha$ between them, wherein, upon operation, the light emerging from the output end portion of the first waveguide impinges on a surface of the membrane at an angle of incidence $\beta$, and wherein $\beta=f(\alpha,\theta)$; the microphone/sensor further including pressure-equalizing means for equalizing the pressure on the two surfaces of the membrane.

12 Claims, 3 Drawing Sheets

OPTICAL MICROPHONE/SENSOR

FIELD OF THE INVENTION

The present invention relates to optical microphone/sensors. More particularly, the invention relates to fiber optic and solid waveguide microphone/sensors for sensing sounds in audio, ultra-sound and infra-sound ranges and for measuring distances to, and/or physical properties of, a medium according to U.S. Pat. No. 5,777,091 and U.S. patent application Ser. No. 09/037,137, the teachings of which are incorporated herein by reference.

BACKGROUND OF THE INVENTION

In accordance with the teachings of U.S. Pat. No. 5,777,091 and U.S. patent application Ser. No. 09/037,137, an optical sensor consists of a source of light that produces the light used for measurements. One optical fiber or waveguide channels this light to the sensor's optical head; after the light is reflected from the measuring medium, it passes through another optical fiber or waveguide to a light-intensity measuring means that measures the intensity of the returned light.

Microphone/sensors, especially those of the subject kind, are very sensitive to changes in atmospheric pressure. Such changes influence the sensitivity and accuracy of the microphone/sensors.

DISCLOSURE OF THE INVENTION

It is therefore a broad object of the present invention to overcome the shortcomings of the known type of optical microphone/sensors and to provide microphone/sensors which are not sensitive to changes in atmospheric pressure.

It is a further object of the present invention to provide a optical microphone/sensor made of non-metallic parts, rendering the microphone/sensor insensitive to electromagnetic fields.

In accordance with the present invention, there is provided an microphone/sensor, comprising: a housing closed at one end; a pair of optical waveguides each fixed at one end to said closed end of the housing, and extending within the housing towards the opposite end of the housing; a light source optically coupled to said one end of one of the optical waveguides; a light detector optically coupled to said one end of the other optical waveguide; a deformable membrane deformable by pressure waves closing the opposite end of said housing proximate to the opposite end of said pair of optical waveguides to form a sealed chamber with said closed one end of the housing; said membrane having an inner surface facing, but spaced from, said opposite ends of the optical waveguides, and an outer surface exposed to pressure wave in the atmosphere, such that said inner surface of the membrane influences light received by said other optical waveguide from said one optical waveguide in accordance with deformations of said membrane; and equalizing means for equalizing the pressure on the opposite sides of said membrane; characterized in that said equalizing means includes a capillary tube passing through the housing into said sealed chamber.

In the described preferred embodiments, the capillary tube is of a length and diameter that only small changes in atmospheric pressure resulting in frequency changes of less than 0.01 Hz influence the pressure within said sealed chamber.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a cross-sectional view across a fiber optic microphone/sensor according to an embodiment of the present invention;

FIGS. 2 to 5 are cross-sectional views across various further embodiments of a fiber optic microphone/sensor according to the present invention, and FIG. 6 is a cross-sectional view of an embodiment based on a solid waveguide.

DETAILED DESCRIPTION OF PREFERRED EMBODIMENTS

Figure 1:
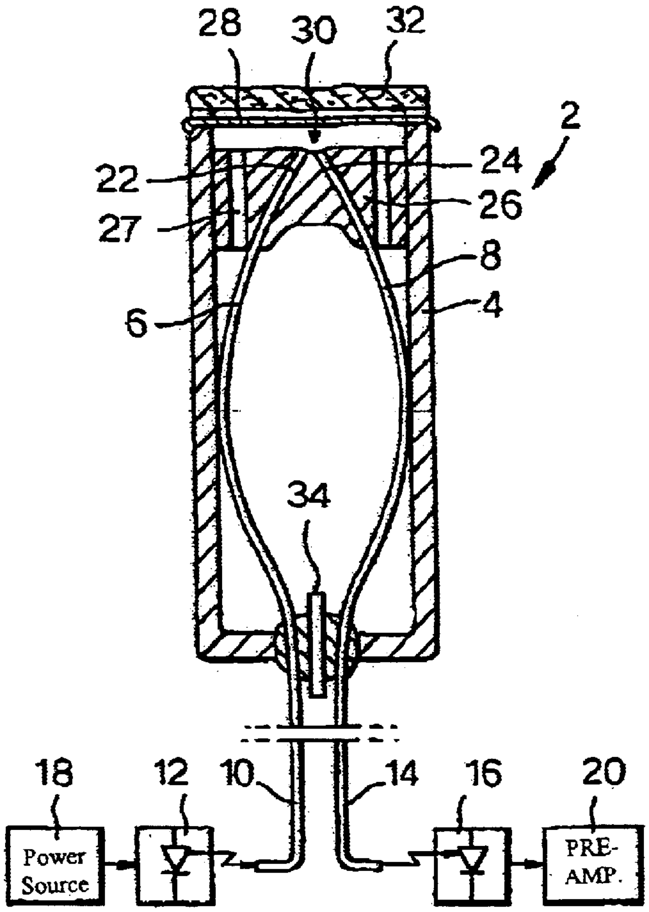

In FIG. 1 there is illustrated a microphone/sensor 2 made of non-metallic materials according to the present invention, consisting of a housing 4 and a pair of optical fibers 6 and 8 extending along the inside surfaces of the housing, each of the fibers having an input end and an output end. The input end 10 of fiber 6 is connected to receive light from a light source 12. The output end 14 of fiber 8 is connected to a photodetector 16. The light source 12 receives power from any suitable power source 18, while the output of photodetector 16 is connected to a preamplifier 20. The rims of the output end portion 22 of fiber 6 and the input end portion 24 of fiber 8 are cut at an angle and are disposed with respect to each other so as to form an angle between them, as taught by U.S. Pat. No. 5,771,091. The end portions 22 and 24 are embedded in a solidified material 26 having one or more through-going holes 27, or are otherwise fixedly held inside the housing 4, thus constituting the microphone/sensor head.

The microphone/sensor 2 further includes a membrane 28 stretched across the housing opening 30. Advantageously, an acoustic filter 32 is placed above membrane 28 to protect the membrane against mechanical damage. A capillary-like tube 34 passes through the wall of housing 2, conveniently at the bottom portion thereof adjacent to fibers 6 and 8. The length and diameter of tube 34 are selected so that only very small changes in atmospheric pressure, e.g., those resulting in frequency changes of less than 0.01 Hz, will influence the pressure inside the housing 4. In other words, the task of tube 34 is to substantially equalize the pressure prevailing inside the housing of microphone/sensor 2 to the atmospheric pressure surrounding the microphone/sensor, thereby avoiding the formation of unbalanced forces on the two surfaces of the membrane. In this connection, it is noted that the membrane 28 is selected in accordance with the predetermined working frequency range for which the microphone/sensor is intended. A membrane sensitive to audio or acoustic waves will work in the range of from about 20 Hz to 20 KHz. A microphone/sensor membrane for infra-sound frequencies is intended to work at frequencies between from about 0.01 Hz to 500 Hz; for ultra-sound frequencies, it is intended to work at frequencies of from about 20 KHz to 500 KHz.

Figure 2:
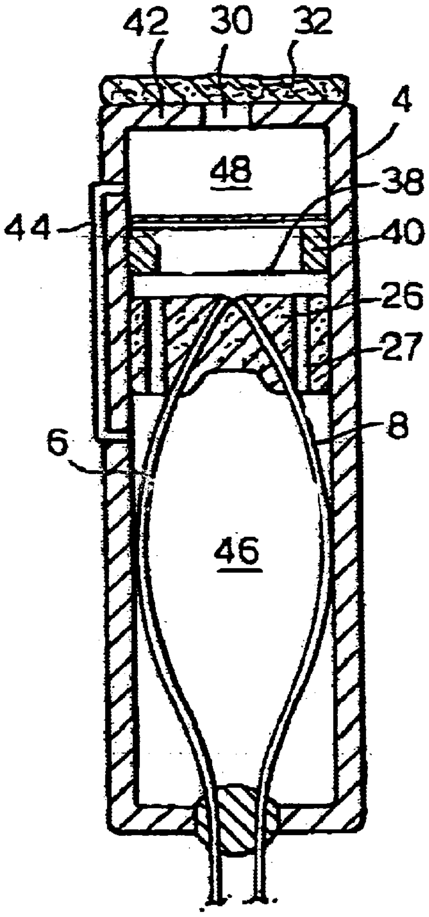

FIG. 2 illustrates a slight modification of the microphone/sensor 2 of FIG. 1, in which the membrane 38 is attached to a ring 40 disposed above material 26. The housing 4 partially closes the opening 30 with an annular wall portion 42, serving as a protective cover. Optionally, acoustic filter 32 is affixed on the wall portion 42. A pressure-equalizing tube 44 extends along the outer periphery of the upper portion of housing 4, leading from the chamber 46 in the interior of the housing 4 below material 26 to chamber 48 above the membrane 38.

Figure 3:
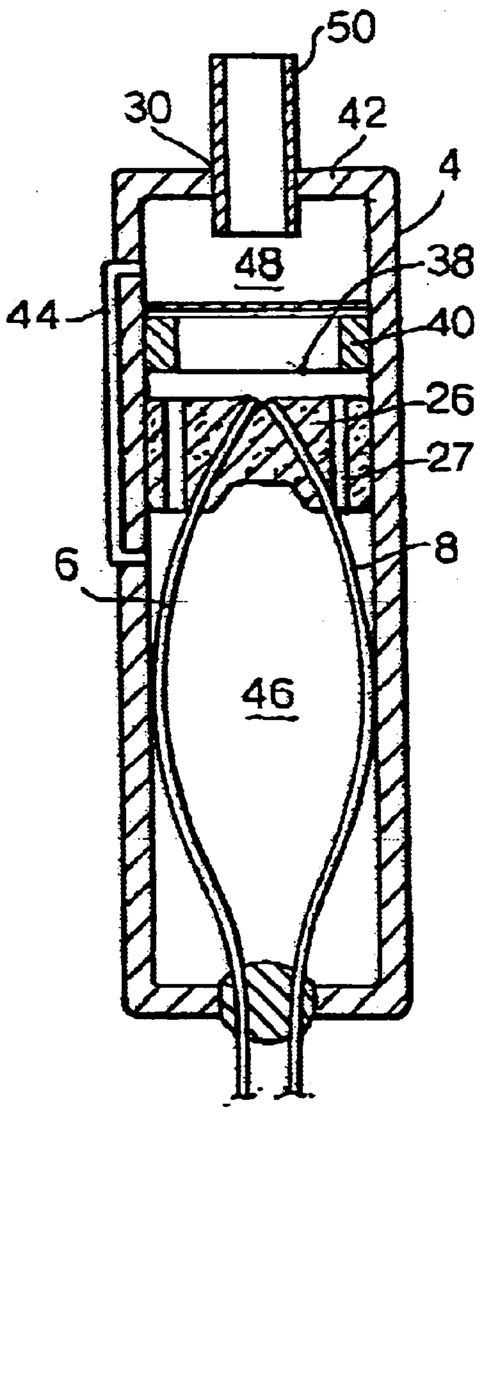

Referring now to FIG. 3, there is shown a microphone/sensor 2 of the same construction as that of FIG. 2, with the addition of a small tube 50 affixed in opening 30 of wall portion 42.

Figure 4:
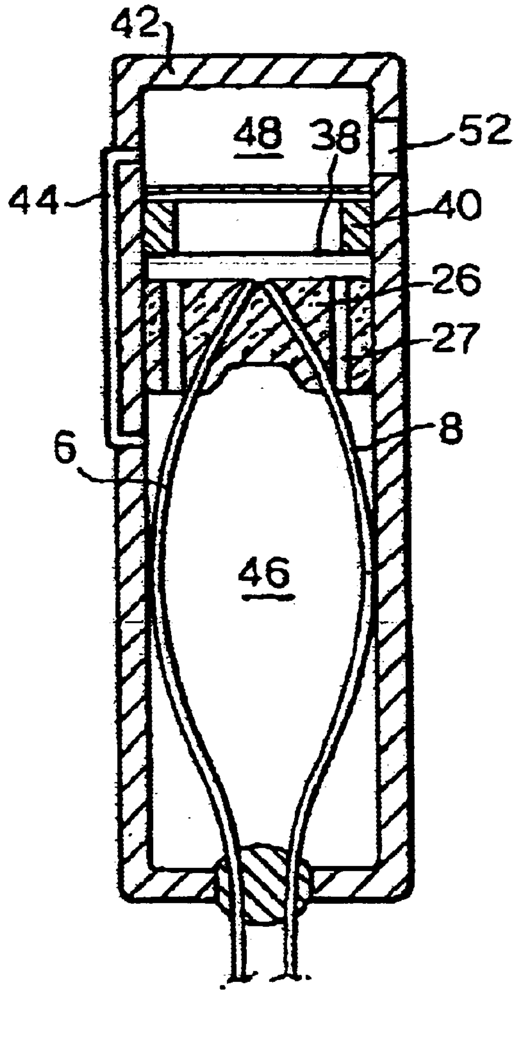

FIG. 4 shows a structure of a microphone/sensor similar to that of FIG. 2, except that the sound wave admission opening 52 is located at the peripheral wall portion of protective wall portion 42. More than a single opening can be provided.

Figure 5:
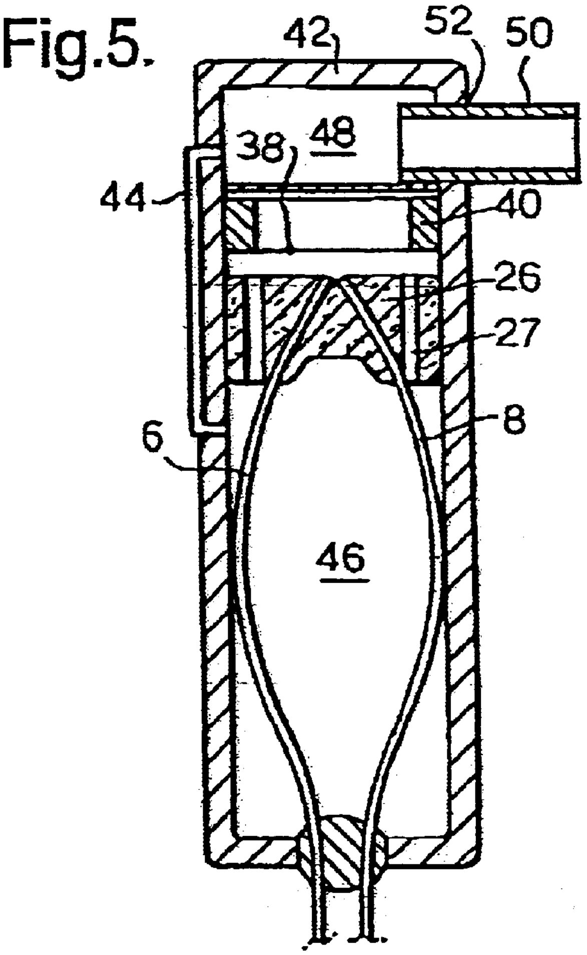

An improvement of the embodiment of FIG. 4 is illustrated in FIG. 5, wherein there is shown a small tube 50 attached to the opening 52 made in the peripheral wall. The sound reception with such a tube is more effective than it is without the tube.

Figure 6:
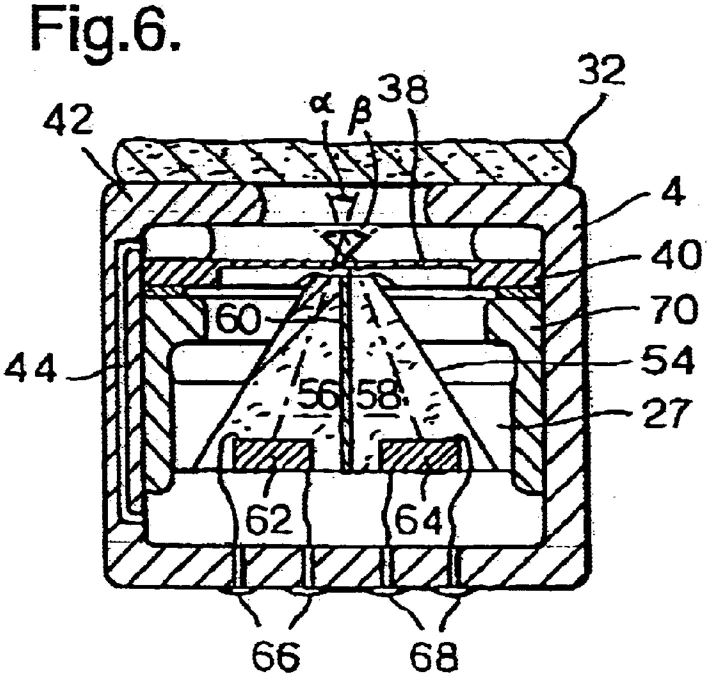

In FIG. 6 there is shown an embodiment of an optical sensor/microphone similar to that of FIG. 2, however, instead of optical fibers 6 and 8, the optical waveguides are constituted by a solid body 54. The body 54 comprises light guides 56, 58 separated by an opaque partition 60. Advantageously, a light source 62 and a detector 64 are embedded in the body 54. Electrical terminals 66, 68 lead to the light source 62 and detector 64, respectively. The solid body 54 can be affixed inside housing 4 by means of any suitable material 70.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical microphone/sensor, comprising:

a housing closed at one end;

a pair of optical waveguides each fixed at one end to said closed end of the housing, and extending within the housing towards the opposite end of the housing;

a light source optically coupled to said one end of one of the optical waveguides;

a light detector optically coupled to said one end of the other optical waveguide;

a deformable membrane deformable by pressure waves closing the opposite end of said housing proximate to the opposite end of said pair of optical waveguides to form a sealed chamber with said closed one end of the housing;

said membrane having an inner surface facing, but spaced from, said opposite ends of the optical waveguides, and an outer surface exposed to pressure wave in the atmosphere, such that said inner surface of the membrane influences light received by said other optical waveguide from said one optical waveguide in accordance with deformations of said membrane;

and equalizing means for equalizing the pressure on the opposite sides of said membrane;

characterized in that said equalizing means includes a capillary tube passing through the housing into said sealed chamber.

2. The optical microphone/sensor according to claim 1, wherein said capillary tube is of a length and diameter that only small changes in atmospheric pressure resulting in frequency changes of less than 0.01 Hz influence the pressure within said sealed chamber.

3. The optical microphone/sensor according to claim 1, wherein one end of said capillary tube extends through said closed one end of the housing.

4. The optical microphone/sensor according to claim 3, wherein said opposite end of the capillary tube extends directly to the atmosphere.

5. The optical microphone/sensor according to claim 1, wherein said opposite end of the housing includes a protective cover spaced from said opposite surface of the membrane to define a second chamber therewith exposed to the atmosphere; said capillary tube including one end received within said sealed chamber and an opposite end received within said second chamber.

6. The optical microphone/sensor according to claim 5, wherein the portion of said capillary tube between its two ends extends along the outer surface of said housing.

7. The optical microphone/sensor according to claim 5, wherein said second chamber is exposed to the atmosphere by an opening in said opposite end of the housing.

8. The optical microphone/sensor according to claim 7, wherein said opening is an end wall at said opposite end of the housing and is covered by an acoustic filter.

9. The optical microphone/sensor according to claim 7, wherein said opening is in a side wall at said opposite end of the housing.

10. The optical microphone/sensor according to claim 5, wherein said second chamber is exposed to the atmosphere by a tube passing through said opposite end of the housing.

11. The optical microphone/sensor according to claim 10, wherein said tube passes through the end wall at said opposite end of the housing.

12. The optical microphone/sensor according to claim 10, wherein said tube passes through a side wall at said opposite end of the housing.

* * * * *